United States Patent [19]
Yazaki et al.

[11] Patent Number: 5,094,847
[45] Date of Patent: Mar. 10, 1992

[54] METHOD FOR PRODUCING AN ANTIBACTERIAL MOLDED ARTICLE OF POLYOLEFIN RESIN COMPOSITION COMPRISING A ZEOLITE CONTAINING SILVER AND SUBJECTING THE SURFACE OF THE MOLDED ARTICLE TO CORONA DISCHARGE

[75] Inventors: Takao Yazaki; Masataka Noro; Takashi Matsui, all of Mie, Japan

[73] Assignee: Mitsubishi Petrochemical Co., Ltd., Tokyo, Japan

[21] Appl. No.: 583,850

[22] Filed: Sep. 13, 1990

[30] Foreign Application Priority Data

Oct. 20, 1989 [JP] Japan .................................. 1-273476

[51] Int. Cl.$^5$ ..................... A61K 47/32; A61K 33/38; A01N 59/16
[52] U.S. Cl. .................................. 424/618; 424/411; 424/412; 424/618; 523/122
[58] Field of Search .................... 424/78, 83, 405, 411, 424/412, 618; 514/953; 523/122; 524/403

[56] References Cited

U.S. PATENT DOCUMENTS

| | | | |
|---|---|---|---|
| 4,490,462 | 12/1984 | Kawaguchi et al. | 430/542 |
| 4,525,410 | 6/1985 | Hagiwara et al. | 424/411 |
| 4,613,517 | 9/1986 | Williams et al. | 424/78 |
| 4,938,955 | 7/1990 | Niira et al. | 424/79 |
| 4,938,958 | 7/1990 | Niira et al. | 424/79 |

OTHER PUBLICATIONS

ASTM D 1238-86 Standard Test Method for Flow Rates of Thermoplastics by Extrusion Plastometer.

Primary Examiner—Thurman K. Page
Assistant Examiner—Edward J. Webman
Attorney, Agent, or Firm—Oblon, Spivak, McClelland, Maier & Neustadt

[57] ABSTRACT

A method for producing an antibacterial molded article of polyolefin resin is described, comprising molding a polyolefin resin composition having compounded therewith 0.01% by weight or more, based on the polyolefin resin composition, of an antibacterial agent which is a zeolite containing silver to form a molded article of a desired shape, and thereafter subjecting the antibacterial surface of the molded article to a corona discharge treatment.

5 Claims, No Drawings

5,094,847

METHOD FOR PRODUCING AN ANTIBACTERIAL MOLDED ARTICLE OF POLYOLEFIN RESIN COMPOSITION COMPRISING A ZEOLITE CONTAINING SILVER AND SUBJECTING THE SURFACE OF THE MOLDED ARTICLE TO CORONA DISCHARGE

FIELD OF THE INVENTION

The present invention relates to a method for producing an antibacterial molded article of polyolefin resin having excellent antibacterial activity. In particular, it is useful in producing a molded article made of a polyolefin resin such as food packaging films or containers.

BACKGROUND OF THE INVENTION

Packaging for various foods using molded articles such as polyolefin resin films or containers is now used for general purposes as an indispensable packaging means.

In addition to the basic requirements for packaging using molded articles of polyolefin resin, such as improvement of appearance of foods, prevention of adhering of bacteria to foods, and prevention of drying of foods, there has been a demand for packaging to serve to maintain freshness of foods, and much study is being given packaging materials meeting such a demand. For example, from the standpoint that freshness of foods can be maintained by using sterilized packaging films or containers, various studies have been directed to incorporation of antibacterial agents or antifungal agents into raw resins of packaging films or containers.

On the other hand, various antibacterial agents which can be added in raw resins have been proposed in the field of general food packaging. When it is considered that an antibacterial agent dissolved out from a packaging film or container would contaminate the food, non-migratory substances, e.g., antibacterial zeolites which contain a metal having antibacterial activity such as silver, are regarded favorable.

However, in the case of the film or container obtained by molding a resin composition having compounded therewith the antibacterial zeolite powder, most of zeolite powders are embedded in the resin, so that they do not come to exhibit antibacterial activity, and zeolite powders present only in the neighborhood of the surface of molded article exhibit antibacterial activity. Therefore, in order to get the desired antibacterial activity, a large amount of zeolite powders was required to be added therein. However, there are problems that the addition of a large amount of rigid inorganic powders into the resin material lowers not only appearance of molded articles such as transparency and surface gloss, and physical property such as strength, but also injures the surface of molded article due to friction because the surface is roughened by the inorganic powders. Further, the stretch-packaging film thus obtained has serious disadvantages such as greatly reduced self-adhesion required as a stretch-packaging film.

The present inventors have found that as an antibacterial agent being capable of solving such problems of zeolite powders a silver salt of carboxylic acid and a silver salt of an alkyl ester, a phenyl ester, or an alkylphenyl ester of phosphoric acid or phosphorous acid are effective, as disclosed in Japanese patent application Nos. 1-211069 and 1-211070. However, the addition of a large amount of such organic antibacterial agents into resin materials is liable to change physical properties in the surface of molded articles due to bleedout.

Since an antibacterial agent tends to influence inherent physical properties of resin materials and it is generally expensive, if it can give sufficient antibacterial activity, it is preferred that the content thereof be small.

A corona discharge treatment intends to increase the affinity of printing inks, paints, or adhesives, etc., to the surface of non-polar polyolefin resin molded articles, namely, it is widely used to improve the adhesion properties of resins to be laminated, the deposition properties of metals to be deposited, or the adhesion properties of paints, printing inks.

SUMMARY OF THE INVENTION

An object of the present invention is to give sufficient antibacterial activity to polyolefin resin molded articles without detriment to an inherent good physical property of a polyolefin resin, namely, at a low concentration of an antibacterial agent. This object can be attained by subjecting the surface of the molded article of a polyolefin resin composition containing a specified antibacterial agent to a corona discharge treatment.

Accordingly, the present invention relates to a method for producing an antibacterial molded article of polyolefin resin comprising molding a polyolefin resin composition having compounded therewith 0.01% by weight or more, based on the polyolefin resin composition, of an antibacterial agent containing silver to form a molded article of a desired shape, and thereafter subjecting the antibacterial surface of the molded article to a corona discharge treatment.

The polyolefin resin molded articles according to the present invention have excellent antibacterial activity without detriment to an inherent physical property of a polyolefin resin.

Therefore, the molded articles of the present invention, for example, films for various uses, containers, etc., have excellent antibacterial activity, and basic properties required as a molded article, for example, good appearance, transparency, and surface property are retained.

It was quite unexpected that antibacterial activity of polyolefin resin molded articles having an antibacterial agent added therein could be increased by means of a corona discharge treatment which has been generally used for increasing printability as well as adhesion property.

In addition, it is possible to lower the content of antibacterial agents which are generally expensive, and accordingly, economic effects are increased.

DETAILED DESCRIPTION OF THE INVENTION

[I] Polyolefin Resin

The present invention can use any polyolefin resin if antibacterial agents can be fully diffused therein, and if it can be molded with a predetermined amount of antibacterial agents added therein. Examples of such polyolefin resins include an ethylene homopolymer; a copolymer of ethylene and other α-olefins, e.g., propylene, butene-1, hexene-1, 4-methylpentene-1, and octene-1; a copolymer of ethylene and vinyl acetate; a copolymer of ethylene and an aliphatic unsaturated carboxylic acid, or an aliphatic unsaturated carboxylic acid alkyl ester; a propylene homopolymer; a copolymer of propylene and α-olefins, e.g., ethylene, butene-1, hexene-1.

These polyolefin resins can be used either singly or in combination of two or more thereof.

[II] Antibacterial Agent

Antibacterial agents which can be used in the present invention contain silver. Such antibacterial agents include, for example, zeolite, and silver salts of carboxylic acid, or alkyl phosphate.

(Antibacterial Zeolite)

Antibacterial zeolite which can be used in the present invention is natural or synthetic zeolite comprising aluminosilicate which holds a silver ion having antibacterial activity at the ion-exchangeable sites thereof.

An antibacterial zeolite powder which is particularly preferred in the present invention has a specific surface area of not less than 150 m$^2$/g, based on anhydrous zeolite, and an average particle size of not greater than 10 μm, and more preferably from 1 to 5 μm.

(Silver Salt of Carboxylic Acid)

Examples of such compounds include silver salts of the following carboxylic acids:

(A) aliphatic saturated monocarboxylic acids having 1 to 30, preferably 2 to 22 carbon atoms (e.g., acetic acid, propionic acid, butyric acid, valeric acid, lauric acid, myristic acid, palmitic acid, stearic acid, docosanoic acid);

(B) aliphatic saturated dicarboxylic acids having 2 to 34, preferably 2 to 8 carbon atoms (e.g., oxalic acid, succinic acid, adipic acid, suberic acid, sebacic acid);

(C) aliphatic unsaturated carboxylic acids (e.g., oleic acid, erucic acid, maleic acid, fumaric acid);

(D) carbocyclic carboxylic acids (e.g., benzoic acid, phthalic acid, cinnamic acid, hexahydrobenzoic acid, abietic acid, hydrogenated abietic acid);

(E) hydroxycarboxylic acid (e.g., lactic acid, malic acid, tartaric acid, citric acid, salicylic acid);

(F) aminocarboxylic acid (e.g., aspartic acid, glutamic acid).

Preferred of these compounds are silver salts of the (A) aliphatic saturated monocarboxylic acids, particularly, silver laurate, silver stearate; silver salts of the (C) aliphatic unsaturated carboxylic acids, particularly, silver oleate; and silver salts of the (D) carbocyclic carboxylic acids, particularly, silver benzoate, silver hydrogenated abietate.

(Silver Salts of Alkyl Ester, Phenyl Ester, or Alkylphenyl Ester of Phosphoric Acid or Phosphorous Acid)

Examples of such compounds include the followings:

(A) mono or di-silver salts of monoalkyl($C_1$ to $C_{22}$) ester of phosphoric acid;

(B) mono or di-silver salts of monoalkyl($C_1$ to $C_{22}$) ester of phosphorous acid;

(C) mono-silver salts of dialkyl(each $C_1$ to $C_{22}$) ester of phosphoric acid;

(D) mono or di-silver salts of monophenyl ester of phosphoric acid;

(E) mono or di-silver salts of monophenyl ester of phosphorous acid;

(F) mono-silver salts of diphenyl ester of phosphoric acid;

(G) mono or di-silver salts of mono{alkyl($C_1$ to $C_{22}$)phenyl} ester of phosphoric acid;

(H) mono or di-silver salts of mono{alkyl($C_1$ to $C_{22}$)phenyl} ester of phosphorous acid;

(I) mono-silver salts of di{alkyl(each $C_1$ to $C_{22}$)phenyl} ester of phosphoric acid;

Preferred of these compounds are the (A) mono or di-silver salts of monoalkyl ester of phosphoric acid particularly, those containing alkyl group having 6 to 22 carbon atoms, more particularly, di-silver salts of stearyl phosphate; the (C) mono-silver salts of dialkyl ester of phosphoric acid, particularly, those containing alkyl group each having 6 to 22 carbon atoms, more particularly, mono-silver salts of dioctyl phosphate; and the (I) mono-silver salts of di(alkylphenyl) ester of phosphoric acid, particularly, those containing alkyl group each having 4 to 22 carbon atoms, more particularly, mono-silver salts of di(4-t-butylphenyl) phosphate, or mono-silver salts of di(nonylphenyl) phosphate.

[III] Resin Composition

The amount of an antibacterial agent should be 0.01% by weight or more based on the polyolefin resin composition. If it is less than 0.01% by weight, enough antibacterial activity cannot be obtained.

The amount of the antibacterial agent preferably ranges from 0.05 to 2% by weight.

As a method for mixing the aforementioned antibacterial agents with polyolefin resins, there can be adopted various known methods comprising a method in which the two components are directly melt-kneaded using a kneading machine such as a roll mill, a Banbury mixer, a kneader, an extruder; a method in which the antibacterial agents are in advance mixed with a polyolefin resin powder using a Henschel mixer to make the dispersion better, and thereafter the mixture is melt-kneaded using the above method; and a method in which a masterbatch of high concentration is prepared in advance, followed by diluting it.

If desired, the resin composition according to the present invention may be incorporated therein a small amount of other components being capable of mixing therewith without detriment to the effects of the present invention. Therefore, the resin composition used in the present invention, in addition to those made of only polyolefin resins and the above-mentioned antibacterial agents, can be added therein such components as the occasion demands.

The components which may be used in the present invention are known. Examples of these components include various resins; antioxidants; neutralizers such as metallic soaps, fatty amides; lubricants; anti-blocking agents; antistatic agents; ultraviolet absorbents; light-stabilizers; brightening agents; and coloring agents such as organic pigments, and inorganic pigments. Such components can be directly used, or in the form of a masterbatch containing resins. The kind and content of such components can be determined according to the uses of the resin molded articles of the present invention and the object of incorporation thereof.

[IV] Process for Molding Resin Composition

The resin composition according to the present invention can be molded using various known molding methods such as an injection molding, an extrusion molding, a blow molding, or a compression molding to form a desired shaped molded article such as molds or films. The antibacterial surface of the molded resin articles thus obtained is subjected to a corona discharge treatment. Alternatively, the molded resin articles thus obtained may be processed optionally together with other materials (including other resin molded articles), the resulting products may be optionally molded again, and thereafter the antibacterial surface of the molded articles is subjected to a corona discharge treatment.

Examples of such optional other materials include polyolefin resins having no antibacterial agents, other thermoplastic resins, resin foams, papers, and metal foils.

The molded resin articles obtained by processed together with the polyolefin resins having no antibacterial agent or other thermoplastic resin can be produced using conventional methods such as co-extrusion methods with using the polyolefin resins having no antibacterial agent or other thermoplastic resins, extrusion laminating methods on previously molded film or sheet, or dry laminating method together with previously molded film or sheet with adhesives.

[V] Corona Discharge Treatment of Molded Article

A corona discharge treatment can be carried out using a known corona discharge apparatus, e.g., a vacuum tube type and a thyristor type. In the present invention, a corona discharge treatment is usually conducted at a rate of from 30 to 500 W/m$^2$/min, although the treatment conditions can be determined according to uses of molded articles, and kinds and contents of antibacterial agents.

The present invention is now illustrated in greater detail with reference to Examples, but it should be understood that the present invention is not deemed to be limited thereto. All the percents are by weight unless otherwise indicated.

EXAMPLES 1 AND COMPARATIVE EXAMPLE 1

A low-density polyethylene (density: 0.927 g/cm$^3$; MFR (melt flow rate, defined in ASTM D 1238-86) at 190° C.: 4.0 g/10 min) was mixed with an antibacterial zeolite powder which was prepared by A type zeolite (average particle size: 2 μm) having held 5% (on a water-free basis) of silver in the form of an ion, followed by drying with heating at 200° C., at the ratio shown in Table 1. The resin composition thus obtained was kneaded in an extruder (diameter: 50 mm; L/D ratio: 25) at 230° C., followed by molding using a T-die molding method to obtain a film with 15 μm thick. The film was subjected to a corona discharge treatment at a rate of 200 W/m$^2$/min to produce antibacterial films (Examples 1-1, 1-2, and 1-3).

The antibacterial films were tested according to the test methods mentioned hereinafter. The results obtained are shown in Table 1. In Table 1, results of evaluations on a film (Comparative example 1) which was not subjected to a corona discharge treatment are also shown.

EXAMPLES 2 AND COMPARATIVE EXAMPLE 2

A polypropylene resin (density: 0.905 g/cm$^3$; MFR at 230° C.: 2.3 g/10 min) was mixed with the same antibacterial zeolite powder as used in Example 1 at the ratio shown in Table 1. The resin compositions thus obtained were kneaded in the same extruder as used in Example 1 at 230° C., followed by molding to obtain sheets with 400 μm thick. The sheets were subjected to a corona discharge treatment at a rate of 300 W/m$^2$/min to produce antibacterial sheets (Examples 2-1, and 2-2), to which various tests were conducted. Table 1 shows results of evaluations on the antibacterial sheets as well as a sheet (Comparative example 2) which was not subjected to a corona discharge treatment.

TABLE 1

| | Antibacterial Zeolite Content (%) | Corona Discharge Treatment | Antibacterial Activity | Haze (%) |
|---|---|---|---|---|
| Example 1-1 | 0.05 | Do | Have | 3.0 |
| Example 1-2 | 0.5 | Do | Have | 10.5 |
| Example 1-3 | 2.0 | Do | Have | 21.0 |
| Comparative Example 1 | 2.0 | Do not | Have not | 21.0 |
| Example 2-1 | 0.5 | Do | Have | 19.0 |
| Example 2-2 | 2.0 | Do | Have | 24.0 |
| Comparative Example 2 | 2.0 | Do not | Have Not | 24.0 |

EXAMPLES 3 AND COMPARATIVE EXAMPLE 3

(1) The same low-density polyethylene resin as used in Example 1 was mixed with the same antibacterial zeolite powder as used in Example 1 at the ratio shown in Table 2. The resin compositions thus obtained were kneaded in an extruder (diameter: 50 mm; L/D ratio: 25) at 200° C.

(2) The same low-density polyethylene resin as used in Example 1 was kneaded in an extruder (diameter: 65 mm; L/D ratio: 25) at 200° C.

(3) The resin compositions prepared above were fed to a two-layered T-die to form a laminated two-layered film comprised of a 3 μm thick antibacterial zeolite-containing layer and a 17 μm thick another layer, and the surface of antibacterial zeolite-containing layer of the film was subjected to a corona discharge treatment at a rate of 200 W/m$^2$/min, thereby obtaining an antibacterial film (Example 3-1, 3-2, or 3-3). The evaluation results of the films obtained are shown in Table 2 below. Table 2 also shows the evaluation results regarding a film (Comparative example 3) which was produced in the same manner as in the above, except that a corona discharge treatment was not conducted.

TABLE 2

| | Antibacterial Zeolite Content (%) | Corona Discharge Treatment | Antibacterial Activity | Haze (%) |
|---|---|---|---|---|
| Example 3-1 | 0.1 | Do | Have | 1.3 |
| Example 3-2 | 0.5 | Do | Have | 2.7 |
| Example 3-3 | 2.0 | Do | Have | 7.0 |
| Comparative Example 3 | 2.0 | Do not | Have not | 7.0 |

EXAMPLE 4 AND COMPARATIVE EXAMPLE 4

(1) The same polypropylene resin (98%) as used in Example 2 was mixed with the same antibacterial zeolite powder (2.0%) as used in Example 1. The resin compositions thus obtained were kneaded in the same extruder as used in Example 2 at 230° C.

(2) The same polypropylene resin as used in Example 2 alone was kneaded in the same extruder as used in Example 2 at 230° C.

(3) The resin compositions prepared above were fed to a two-layered T-die to form a laminated two-layered sheet comprised of a 15 μm thick antibacterial zeolite-containing layer and a 300 μm thick another layer, and the surface of antibacterial zeolite-containing layer of the sheet was subjected to a corona discharge treatment at a rate of 300 W/m$^2$/min, thereby obtaining a antibacterial sheet. The sheet thus obtained was heated at a surface temperature of 160° C. using a compression molding machine to produce an antibacterial container (Example 4). The evaluation results of the container obtained are shown in Table 3 below. Table 3 also shows the evaluation results regarding a container (Comparative example 4) which was produced in the same manner as in the above, except that a corona discharge treatment was not conducted.

TABLE 3

|  | Antibacterial Zeolite Content (%) | Corona Discharge Treatment | Antibacterial Activity | Gloss Value (%) |
|---|---|---|---|---|
| Example 4 | 2.0 | Do | Have | 68.0 |
| Comparative Example 4 | 2.0 | Do not | Have not | 68.0 |

EXAMPLE 5 AND COMPARATIVE EXAMPLES 5

(1) A resin composition comprising 70% of polybutene-1 (density: 0.915 g/cm$^3$; MFR at 190° C.: 1.8 g/10 min; "M 0200" produced by Shell Chemical Co.), 15% of a propylene-ethylene-butene-1 random copolymer resin (ethylene content: 2.0%; butene-1 content: 13.0%; density: 0.896 g/cm$^3$; MFR at 230° C.: 5.0 g/10 min), and 15% of an ethylene-vinyl acetate copolymer resin (vinyl acetate content: 15%; MFR at 190° C.: 2.0 g/10 min) was kneaded in an extruder (diameter: 65 mm; L/D ratio: 25) at 185° C. to prepare a resin composition for an interlayer.

(2) A resin composition comprising 97.7% of an ethylene-vinyl acetate copolymer resin (vinyl acetate content: 15%; MFR at 190° C.: 2.0 g/10 min), 2.0% of monoglycerol oleate ("Rikemal OL 100" produced by Riken Vitamin Oil Co., Ltd.), and 0.3% of the same antibacterial zeolite powder as used in Example 1 was kneaded in an extruder (diameter: 50 mm; L/D ratio: 25) at 160° C. to prepare a resin composition for an antibacterial zeolite powder-containing surface layer.

(3) A resin composition comprising 98% of the same ethylene-vinyl acetate copolymer resin as used above and 2.0% of the same monoglycerol oleate as used above was kneaded in an extruder (diameter: 50 mm; L/D ratio: 25) at 160° C. to prepare a resin composition for another surface layer.

(4) The three resin compositions prepared above were fed to a three-layered ring die and extruded at a die temperature of 185° C. and inflated at a blow-up ratio of 5.0 to form a laminated three-layered film comprised of a 4 μm thick intermediate layer and a 5 μm thick surface layer on each side thereof, and the surface of antibacterial zeolite-containing layer of the film was subjected to a corona discharge treatment at a rate of 80 W/m$^2$/min, thereby obtaining an antibacterial stretch-packaging laminated three-layered film (Example 5) having a total thickness of 14 μm. The evaluation results of the film obtained are shown in Table 4 below. Table 4 also shows the evaluation results regarding a film (Comparative example 5-1) which was produced in the same manner as in the above, except that a corona discharge treatment was not conducted, and a film (Comparative example 5-2) which was produced in the same manner as in the above, except that antibacterial zeolite content was changed to 3.0% and a corona discharge treatment was not conducted.

TABLE 4

|  | Antibacterial Zeolite Content (%) | Corona Discharge Treatment | Antibacterial Activity | Haze (%) | Self-Adhesion (g/2 cm$^2$) |
|---|---|---|---|---|---|
| Example 5 | 0.3 | Do | Have | 3.0 | 250 |
| Comparative Example 5-1 | 0.3 | Do not | Have not | 3.0 | 240 |
| Comparative Example 5-2 | 3.0 | Do not | Have | 24.0 | 60 |

EXAMPLE 6 AND COMPARATIVE EXAMPLE 6

A polypropylene resin (density: 0.90 g/cm$^3$; MFR at 230° C.: 2.0 g/10 min) was mixed with a silver salt of hydrogenated abietic acid (0.1%). The resin composition thus obtained was extruded by a T-die extruder to obtain a sheet of 1.0 mm thick. The sheet was stretched 5 times in machine direction and 10 times in transverse direction using a successive biaxial stretching method to form a film of 20 μm thick, which was subjected to a corona discharge treatment at a rate of 60 W/m$^2$/min to produce an antibacterial film (Example 6). The evaluation results of the film obtained are shown in Table 5 below. Table 5 also shows the evaluation results regarding a film (Comparative example 6) which was produced in the same manner as in the above, except that a corona discharge treatment was not conducted.

EXAMPLE 7 AND COMPARATIVE EXAMPLE 7

A low-density polyethyl-ene resin (density: 0.920 g/c$^3$; MFR at 190° C.: 1.0 g/10 min) was mixed with mono-silver salt of dioctyl phosphate (0.1%). The resin composition thus obtained was inflated to obtain a film of 30 μm thick. The film was subjected to a corona discharge treatment at a rate of 200 W/m$^2$/min to produce an antibacterial film (Example 7). The evaluation results of the film obtained are shown in Table 5 below. Table 5 also shows the evaluation results regarding a film (Comparative example 7) which was produced in the same manner as in the above, except that a corona discharge treatment was not conducted.

TABLE 5

|  | Antibacterial Zeolite Content (%) | Corona Discharge Treatment | Antibacterial Activity | Haze (%) |
|---|---|---|---|---|
| Example 6 | 0.1 | Do | Have | 1.3 |
| Comparative Example 6 | 0.1 | Do not | Have not | 1.3 |
| Example 7 | 0.1 | Do | Have | 6.7 |
| Comparative Example 7 | 0.1 | Do not | Have not | 6.7 |

(Test Method)

(1) Haze
Measured in accordance with JIS K6714.
(2) Gloss Value
Measured in accordance with JIS K8741.
(3) Self-Adhesion
Two specimens of the film cut to a size of 10mm×20mm were superposed, and a load of 20 kg was applied thereon for 2 minutes. After relieving the load, an adhesive strength under shear was measured by means of a Schopper tensile testing machine at a rate of pulling of 500 mm/min.

(4) Antibacterial Activity

On a specimen of the film cut to a size of 5 cm×5 cm was dropped 0.5 ml of an Escherichia coli cell suspension containing about $10^5$ cell/ml, and the film was preserved at 35° C. The microbial cells on the film were washed off with an SCDLP agar medium immediately after or 24 hours after the dropping of the cell suspension, and number of cells in the washing was measured by a plane culture method. Where the number of cells after 24 hours, preservation was 10 or less and out of the measurable range, the specimen was recognized to be antibacterial. Where the number of cells after 24 hours, preservation was more increased than that counted immediately after the dropping of the cell suspension, the specimen was recognized to be non-antibacterial.

While the invention has been described in detail and with reference to specific embodiments thereof, it will be apparent to one skilled in the art that various changes and modifications can be made therein without departing from the spirit and scope thereof.

What is claimed is:

1. A method for producing an antibacterial molded article of a polyolefin resin comprising molding a polyolefin resin composition having compounded therewith 0.05 to 2% by weight, based on the polyolefin resin composition, of an antibacterial agent selected from natural or synthetic zeolite comprising aluminosilicate which holds a silver ion, silver salt of carboxylic acid, silver salts of alkyl ester, phenyl ester, or alkylphenyl ester of phosphoric acid or phosphorous acid to form a molded article of a desired shape, and thereafter subjecting the antibacterial surface of the molded article to a corona discharge treatment.

2. A method for producing an antibacterial molded article of polyolefin resin as claimed in claim 1, wherein said antibacterial agent is natural or synthetic zeolite powder comprising aluminosilicate which holds a silver ion at the ion-exchangeable sites thereof, and has a specific surface area of not less than 150 $m^2$/g and an average particle size of not greater than 10 μm.

3. A method for producing an antibacterial molded article of polyolefin resin as claimed in claim 1, wherein said molded article is a single-layered film or a single-layered sheet.

4. A method for producing an antibacterial molded article of polyolefin resin as claimed in claim 1, wherein said molded article is a laminated film or a laminated sheet, having a surface layer which is made from the polyolefin resin composition having compounded therewith the antibacterial agent.

5. A method for producing an antibacterial molded article of polyolefin resin as claimed in claim 1, wherein said corona discharge treatment is conducted at a rate of from 30 to 500 W/$m^2$/min.

* * * * *